(12) United States Patent
Shatzky

(10) Patent No.: US 6,948,687 B2
(45) Date of Patent: Sep. 27, 2005

(54) CLAMP FOR HOLDING SOLAR COLLECTORS ON ROOFS

(75) Inventor: Josef Shatzky, Magen (IL)

(73) Assignee: Heliocol USA, Inc., Altamonte Springs, FL (US)

(*) Notice: Subject to any disclaimer, the term of this patent is extended or adjusted under 35 U.S.C. 154(b) by 286 days.

(21) Appl. No.: 10/249,695

(22) Filed: Apr. 30, 2003

(65) Prior Publication Data
US 2004/0216410 A1 Nov. 4, 2004

(51) Int. Cl.[7] .............................................. E05C 19/00
(52) U.S. Cl. ........................ 248/74.4; 248/74.1; 248/49; 52/173.1; 52/698; 403/327; 403/329; 403/330; 403/326
(58) Field of Search ........................... 52/173.3, 698, 52/699, 703; 403/13, 14, 326, 329, 315–317; 248/74.1–74.4, 49, 229.14, 229.24; 24/457, 455

(56) References Cited

U.S. PATENT DOCUMENTS

| | | |
|---|---|---|
| 3,593,386 A | 7/1971 | Hug |
| 3,887,967 A | 6/1975 | Vandenbossche |
| 3,992,758 A | 11/1976 | Noda |
| 4,118,838 A | 10/1978 | Schiefer et al. |
| 4,202,087 A | 5/1980 | Wilderman |
| 4,353,356 A | 10/1982 | Vandenbossche |
| 4,490,888 A | 1/1985 | Levant |
| 4,535,960 A | 8/1985 | Downing et al. |
| 4,561,153 A | 12/1985 | Matsui |
| 4,783,029 A | 11/1988 | Geppert et al. |
| 5,163,643 A | 11/1992 | Auclair |
| 5,746,029 A | 5/1998 | Ullman |
| 5,768,831 A | 6/1998 | Melchoir |
| 5,823,176 A | 10/1998 | Harris |
| 5,896,720 A | 4/1999 | Bond |
| 5,971,663 A | 10/1999 | Brothers |
| 6,164,603 A | 12/2000 | Kawai |
| 6,205,719 B1 | 3/2001 | Bruce |
| 6,311,935 B1 | 11/2001 | Mullen, Jr. |
| 6,516,498 B2 | 2/2003 | LaCoy et al. |

Primary Examiner—Jeanette Chapman
(74) Attorney, Agent, or Firm—Smith & Hopen, P.A.; Ronald E. Smith; Anton J. Hopen (57) ABSTRACT

A clamp having a clamp base that is attachable to a flat or sloped roof. A clamp top is releasably attachable to the clamp base. The clamp top includes a pedestal that is snap-fittingly engaged to the clamp base. The pedestal is made in two parts that are interconnected by an interconnecting wall that is releasably engaged by a locking member that forms a part of the clamp base. The header of a solar collector is confined in a space defined by the clamp base and clamp top. In a barrel tile application, a plurality of feet are attached to the bottom of the clamp base. At least one foot abuts the tile on opposite sides of a longitudinal axis of the tile. The bottom of each foot is contoured to match the convex surface of the tile. No feet are needed where the roof covering is flat.

12 Claims, 6 Drawing Sheets

FIG. 1

PRIOR ART

CLAMP FOR HOLDING SOLAR COLLECTORS ON ROOFS

BACKGROUND OF INVENTION

1. Field of the Invention

This invention relates, generally, to clamps. More particularly, it relates to a clamp for holding solar collectors or similar items to a flat or sloped roof covered by shingles, tin, barrel tile, or other type of roof covering.

2. Description of the Prior Art

A roof-mounted solar collector often includes a pair of parallel main pipes, usually called the top header and the bottom header, that are interconnected by a plurality of smaller pipes disposed at right angles to the top and bottom headers. On a sloped roof, the top header is the header at the higher of the two elevations. Water from a swimming pool is pumped to the bottom header from which it flows into the smaller pipes where heat from the sun is absorbed before the water flows into the top header. The heated water flowing through the top header is returned to the pool.

A clamp known as a Z-bar is currently in use as the means for mounting a header to the roof of a house. The name is derived from a side elevational view of the clamp. A Z-bar has a first flat part that is secured to the roof and a second flat part that overlies the header. More particularly, the bottom stroke of a "Z" represents the first flat part secured to the roof and the top stroke of a "Z" represents the second flat part that overlies the header. The diagonal part of the "Z" interconnects the two flat parts.

The Z-bar clamp is acceptable to at least some extent in connection with roofs, both sloped and flat, covered by shingles, tin, or the like. It is not completely satisfactory on such roofs, however, for several reasons. First of all, the first flat part of a Z-bar that is secured to a roof as mentioned above is pre-drilled to accept the fastening means that secure the Z-bar to the roof. Specifically, a pair of screw-receiving apertures are formed in said first flat part. If there is no rafter or other support beneath one or both of the apertures, the resulting fastening can be unsatisfactory.

Secondly, since a header is typically formed by joining together a pair of longitudinally aligned pipes, a pipe-joining clamp must be positioned where the two pipes abut one another, and the pipe-joining clamp must be attached to the Z-bar. Thus, the position of the pipe-joining clamp is controlled by the position of the abutting pipes and the position of the pipe-joining clamp determines the position of the Z-bar and hence of the fastening apertures. If the apertures are not aligned with a rafter or other support element below the roof, the fastening of the header will be unsatisfactory for the reason stated above.

Since the position of the pipe-joining clamp determines the position of the Z-bar and hence of the fastening means, the person designing the solar collection installation is restricted and an optimal installation where all fastening members are secured in rafters or other support members often cannot be achieved. Other clamps as well as straps must be installed exactly where spacing occurs between panels or sets of tubes. Attaching such clamps to rafters or other optimal spots on the roof, therefore, is virtually impossible.

The current art is even less satisfactory on barrel tile roofs because each barrel tile presents a convexity. The first flat part of the Z-bar should therefore be attached to each barrel tile at the exact peak or zenith of each tile. There can be only one attachment point at each barrel tile and each attachment point is spaced from its contiguous attachment points by the spacing between contiguous peaks. The pre-drilled apertures of the Z-bar are unlikely to match the peaks of the tiles, with the result that one of the fastening means can be placed at the peak of a tile, but the adjacent fastening means is unlikely to match a peak. The resulting clamping effect is less than optimal.

Other clamps and straps have the same detriment since they must attach to the roof exactly where spacing occurs between panels or sets of tubes.

Z-bars are also unsatisfactory because they space the header slightly above the roof, but not by much. Thus, when a header expands under heat, there is very little room for the header to expand in the vertical or transverse direction. Similarly, the design of a Z-bar does not accommodate longitudinal expansion of a header. When the header expands or contracts due to temperature fluctuations, the fastening screws are stressed and become loose and may even pop out under the force of the expansion or contraction. This of course unacceptably leads to a roof with leaks. Moreover, the collector itself may break under the strain.

This inadequate clearance between a header and roof provided by a Z-bar also leads to abrasion of the roof as the header expands and contracts. Straps and other clamps do not lift the header off the roof at all and lead to severe abrasion of the roof and the header.

Z-bars are even less satisfactory on barrel tile roofs because each barrel tile presents a convexity. The first flat part of the Z-bar should therefore be attached to each barrel tile at the exact peak or zenith of each tile. There can be only one attachment point at each barrel tile and each attachment point is spaced from its contiguous attachment points by the spacing between contiguous peaks. The pre-drilled apertures of the Z-bar are unlikely to match the peaks of the tiles, with the result that one of the fastening means can be placed at the peak of a tile, but the adjacent fastening means is unlikely to match a peak. The resulting clamping effect is less than optimal.

Z-bars and other clamps are also unsatisfactory because they limit the header movement that results from heat driven expansion and contraction of the collector in the lateral and longitudinal directions. When the header expands or contracts due to temperature fluctuations, the fastening screws are stressed and become loose and may even pop out under the force of the expansion or contraction. This of course unacceptably leads to a roof with leaks. Moreover, the collector itself may break under the strain.

An improved clamping means for flat or sloped roofs covered by shingles, tin, barrel tile, and the like is therefore required.

More particularly, a clamping means is needed that can be placed at any position along the length of a header, without limitation to the vicinity of the location where two pipes join to form a header. Such a clamp, unlike a Z-bar, could always be secured to a rafter or other underlying support member. It could also be placed, in barrel tile applications, directly at the apex of a barrel tile in cooperation with another clamp also positioned on the apex of another barrel tile.

A clamp is also needed that provides additional vertical clearance space between a header and a roof to prevent roof abrasion by movement of the header and to accommodate heat-related expansion and contraction of the header. A clamp that allows enhanced longitudinal expansion of the header is also desirable. If a clamp allows heat-related expansion and contraction, both in a vertical or transverse direction and in a longitudinal direction, then the screws that hold it down will not become stressed and will not become loose. Nor will the collector structure itself break.

The needed clamp should be positionable at any preselected point along the extent of a header, and thus at any preselected point on the roof, thereby allowing the designer of a solar collector installation maximum flexibility.

However, in view of the prior art considered as a whole at the time the present invention was made, it was not obvious to those of ordinary skill in the pertinent art how such need could be fulfilled.

SUMMARY OF INVENTION

The long-standing but heretofore unfulfilled need for an improved clamp is now met by a new, useful, and nonobvious invention. The novel clamp for holding a solar collector header on a flat or sloped roof covered by shingles, tin, barrel tile or the like includes a clamp base adapted to overlie the roof covering and a clamp top adapted to releasably engage the clamp base. The clamp base and clamp top collectively form a space between them having a size sufficient to capture and retain without gripping the solar collector header therewithin. The base provides ample clearance between the header and the roof covering to eliminate abrasion of the roof covering by the header as said header moves. Moreover, the space between the clamp base and clamp top is sufficient to allow free movement of the header due to expansion and contraction of the headercollector so that screws that secure the clamp to the roof are not placed under additional stress as the header expands or contracts with temperature changes. Moreover, the base provides ample clearance between the header and the roof covering to eliminate abrasion of the roof covering by the header as said header moves.

In an embodiment of the invention adapted to be used in the environment of a barrel tile roof, the clamp base includes a plurality of feet. Each foot of the plurality of feet is adapted to abuttingly engage a barrel tile. At least one foot of the plurality of feet is positioned on the barrel tile in spaced relation from a longitudinal centerline of the barrel tile on a first side of the longitudinal centerline and at least one foot of the plurality of feet is positioned on the barrel tile in spaced relation from the longitudinal centerline on a second side thereof.

Accordingly, at least two feet of the plurality of feet abuttingly engage the barrel tile on opposite sides of the longitudinal centerline.

In the environment of a shingle or tin-covered roof, the feet are not needed. However, the novel clamp nonetheless provides the advantages of being positionable at any location along the extent of the header, of spacing the header above the roof, and in allowing longitudinal, lateral and transverse expansion without placing additional stress on the fasteners that secure the clamp to the roof.

The clamp base includes a base wall. A plurality of longitudinally and transversely disposed partition walls depend from the base wall. A plurality of chambers are formed by the partition walls.

Each foot of the plurality of feet has a top part and a bottom part. Each top part is formed of a resilient, elastomeric material and is secured by a press fit into a preselected chamber of the plurality of chambers. Each bottom part is larger than its associated top part so that each bottom part limits the depth of insertion of each top part into its associated chamber.

Each bottom part has an inclined bottom wall to conform to the convex shape of the barrel tile. Again, such feet are not needed in the environment of a flat shingle roof.

At least one aperture is formed in the base wall so that at least one fastening means is adapted to extend through the aperture and engage the roof.

A recess is formed in the base wall in the vicinity of the at least one fastening means so that the fastening means does not interfere with a header positioned between the clamp base and the clamp top.

The clamp top includes a top part adapted to overlie the header. The clamp top further includes a pedestal disposed at an angle of substantially ninety degrees relative to the top part. The clamp base has a bottom part adapted to underlie the header. The top part and the bottom part are adapted to capture the header between them when the clamp top is received by the clamp base.

The clamp base is adapted to releasably engage the pedestal. The clamp base includes a pedestal-receiving space defined by an upstanding rear wall and an upstanding forward wall.

The upstanding rear wall is formed in three parts including a first rear wall, a second rear wall laterally spaced apart from the first rear wall, and a center locking wall disposed between the first and second rear walls.

The first and second rear walls are constructed so that they are rigid and inflexible. The center locking wall is constructed so that it is flexible and resilient and has a position of repose where it is substantially coplanar with the first and second rear walls. A pedestal-engaging means is formed on a forward surface of the center locking wall. The pedestal-engaging means is adapted to releasably engage the pedestal when the pedestal is positioned in the pedestal-receiving space.

The pedestal has a first part and a second part disposed in laterally spaced apart relation to one another. An interconnecting wall is disposed in interconnecting relation to the first part and the second part. The pedestal-engaging means is disposed in overlying relation to a top edge of the interconnecting wall when the pedestal is fully received within the pedestal-receiving space.

The pedestal-engaging means has a downwardly inclined top surface and a flat, substantially horizontal bottom surface. The flat, substantially horizontal bottom surface overlies the top edge of the interconnecting wall when the pedestal is fully received within the pedestal-receiving space.

A protrusion is formed on a rear surface of the interconnecting wall. The protrusion is flush with a bottom edge of said interconnecting wall and increases in thickness gradually so that the protrusion protrudes furthest from the rear surface of the interconnecting wall at the top edge of the interconnecting wall. The protrusion is adapted to slidingly engage the downwardly inclined top surface of the pedestal-engaging means and to transiently displace the center locking wall in a rearward direction until the flat, substantially horizontal bottom surface of the pedestal-engaging means clears the top edge of the interconnecting wall.

The center locking wall has a height greater than the height of the first and second rear walls and is displaceable in a rearward direction to disengage the bottom surface of the pedestal-engaging means from the top edge of the interconnecting wall so that the pedestal and hence the clamp top part may be separated from the clamp bottom part.

A pair of laterally spaced, upstanding alignment posts are formed on the clamp base wall between the rearward wall and the forward wall. A corresponding pair of tubular members, each of which has a post-receiving lumen, are formed in the pedestal, there being a first tubular member formed in the first pedestal part and a second tubular member formed in the second pedestal part.

An important object of this invention is to provide a clamp for holding a solar collector on a flat or sloped roof covered by shingles, tin, barrel tile, and the like.

A more specific object is to provide a clamp that engages a header of a solar collector at any location along the extent of the header.

Another important object is to provide a clamp that allows expansion of a header without applying additional stress to the fastening means that holds the clamp to the roof.

Another important object is to provide a clamp, in a barrel tile environment, having feet that are contoured to fit the convex surface of a barrel tile.

Still another object is to provide a clamp that is easy to assemble and easy to disassemble.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF DRAWINGS

For a fuller understanding of the nature and objects of the invention, reference should be made to the following detailed description, taken in connection with the accompanying drawings, in which.

DETAILED DESCRIPTION

Figure 1:
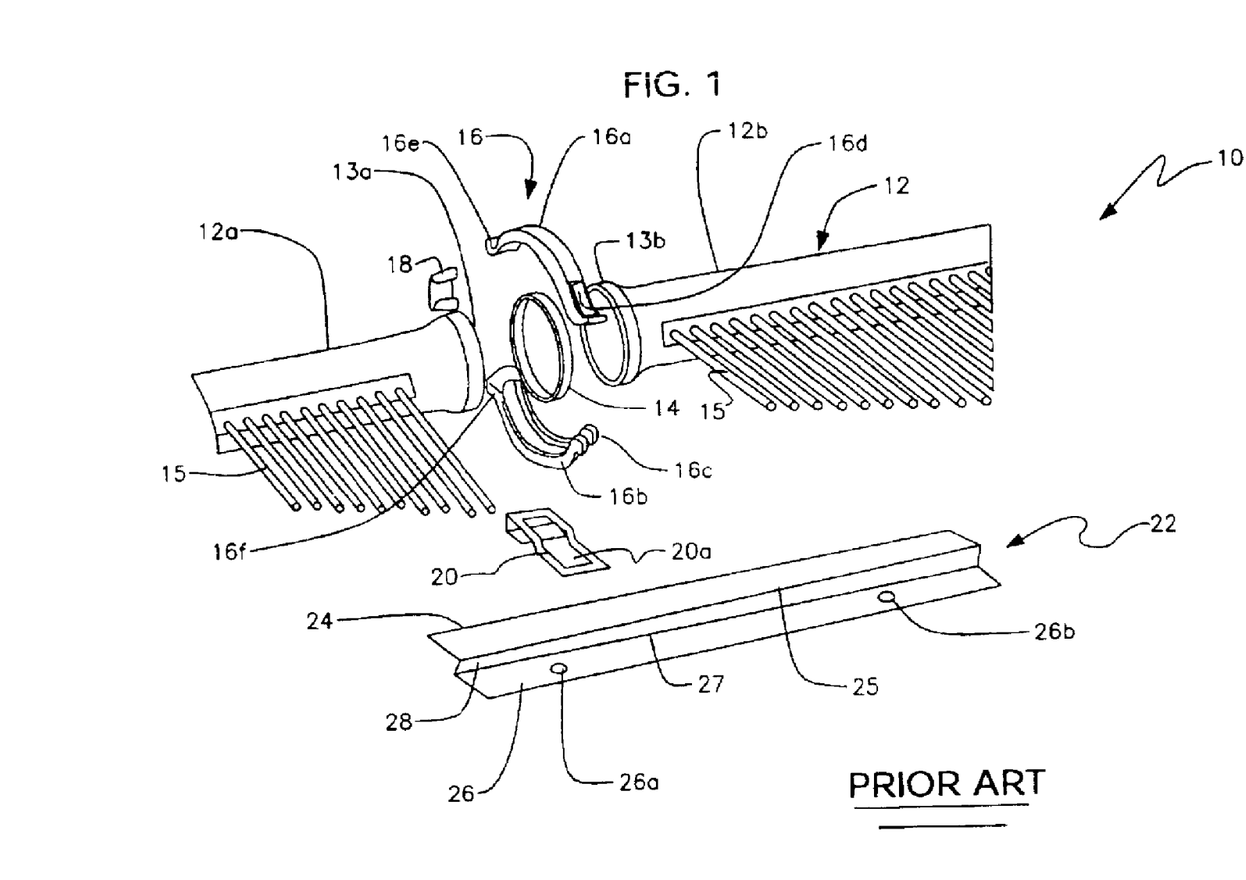
FIG. 1 is an exploded perspective view of a prior art solar collector having a Z-bar clamp for securing the header to a roof.

Referring to FIG. 1, it will there be seen that the reference numeral 10 denotes a prior art structure as a whole.

The top panel header is denoted 12 and typically is formed by pipes 12a and 12b that are interconnected to one another by a clamping assembly. Each pipe 12a, 12b has a slightly enlarged end 13a, 13b, respectively. A water-tight, resilient gasket 14 is positioned in sandwiched relation between said enlarged ends 13a, 13b and said enlarged ends are clamped to one another by a clamp 16 having a top 16a and a bottom 16b.

Although not depicted, a bottom header having essentially the same construction as top header 12 is interconnected to said top header 12 by a plurality of pipes, collectively denoted 15. Swimming pool water is delivered by thermosiphoning or mechanical pump means to the unillustrated bottom header. The water is heated by the sun as it flows through pipes 15 en route to the top header and the heated water is then returned to the pool.

Pipe-joining clamp 16 is preferably a saddle clamp of well-known construction. It includes a protrusion 16c formed in bottom part 16b. Protrusion 16c engages slot 16d formed in top part 16a. The connection between protrusion 16c and slot 16d forms a hinge that enables the diametrically opposite ends of clamp 16 to be spaced apart from one another to receive top header 12 therebetween.

The diametrically opposite ends are denoted 16e, 16f, and each of said opposite ends has a radially-outwardly extending part, unnumbered to avoid cluttering the drawings, that are engaged by opposite ends of latch member 18 in a well-known way.

Each clamp part 16a and 16b has a width sufficient to receive therewithin the respective enlarged ends 13a, 13b of abutting pipes 12a, 12b. Thus, when latch member 18 is in its operative position, a water-tight seal is formed where pipes 12a, 12b meet.

Sled 20 slideably engages Z-bar 22 so that said sled may be positioned at any preselected location along the length of said Z-bar. Sled 20 is adapted to receive clamp base 16b. In this way, clamp base 16b is secured to Z-bar 22 at any preselected position along the length of said Z-bar.

Z-bar 22 has a flat, longitudinally-extending top part 24, a flat longitudinally-extending bottom part 26, and a flat, longitudinally-extending interconnecting part 28 that is formed integrally with a leading edge 25 of top part 24 and a trailing edge 27 of bottom part 26. Top part 24 is placed into overlying relation to top header 12 when Z-bar 22 is in use.

Apertures 26a, 26b are formed in bottom part 26 in longitudinally spaced apart relation to one another as depicted, and said apertures receive fastening means for securing said Z-bar to a roof. As mentioned above, apertures 26a, 26b must be aligned with the respective peaks of barrel tiles where the roof is a barrel tile roof. Since the flat Z-bar does not follow the convex contour of barrel tiles, it is not a suitable means for holding down header 12 in barrel tile roof applications.

Moreover, as noted earlier, the fixed nature of apertures 26a, 26b may prevent placement of the fastening means in their optimal positions relative to rafters or other underlying supports.

Figure 2:
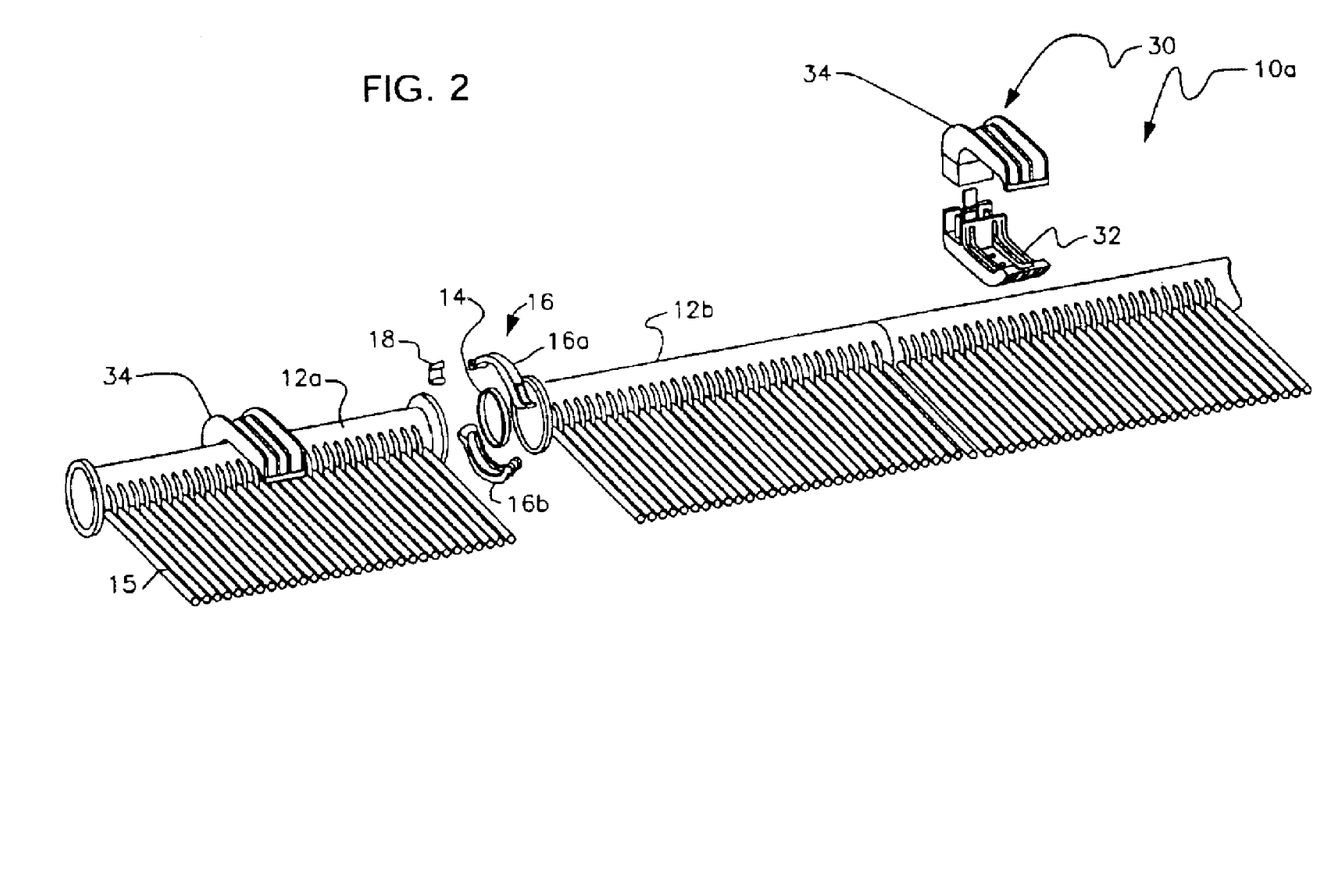
FIG. 2 is an exploded perspective view of a solar collector having the novel alligator clamp for securing the header to a roof.

Referring now to FIG. 2, it will there be seen that a solar collector secured by the present inventive clamp to a flat or sloped roof covered by shingles, tin, barrel tile, or the like is denoted as a whole by the reference numeral 10a.

An illustrative embodiment of the present invention is denoted as a whole by the reference numeral 30.

Figure 3:
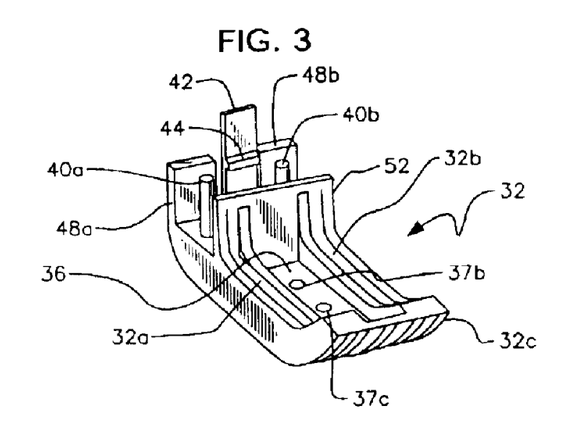
FIG. 3 is a perspective view of the base of the novel alligator clamp.
Figure 4:
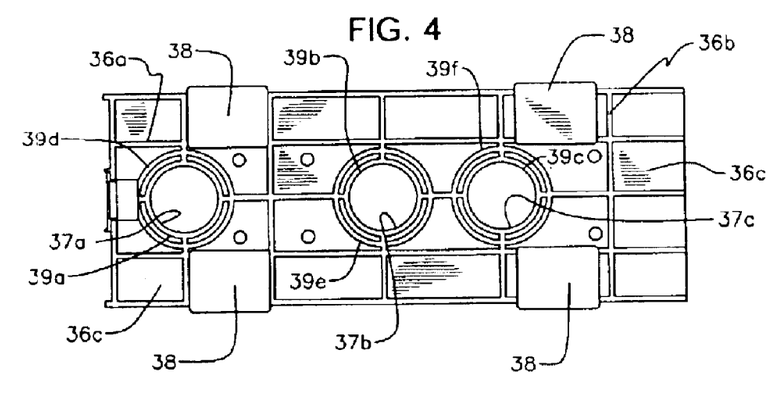
FIG. 4 is a bottom plan view of the novel clamp base.

Clamp base 32 is adapted for releasable engagement with clamp top 34. As best depicted in FIGS. 3 and 4, base 32 includes base wall 36 from which depends a plurality of longitudinally and transversely disposed partition walls denoted 36a, 36b, respectively. Said partition walls collectively form a plurality of open-bottomed chambers, collectively denoted 36c, having partition walls 36a, 36b as their respective sidewalls and having base wall 36 as their upper wall.

Figures 5A, 5B, 6:
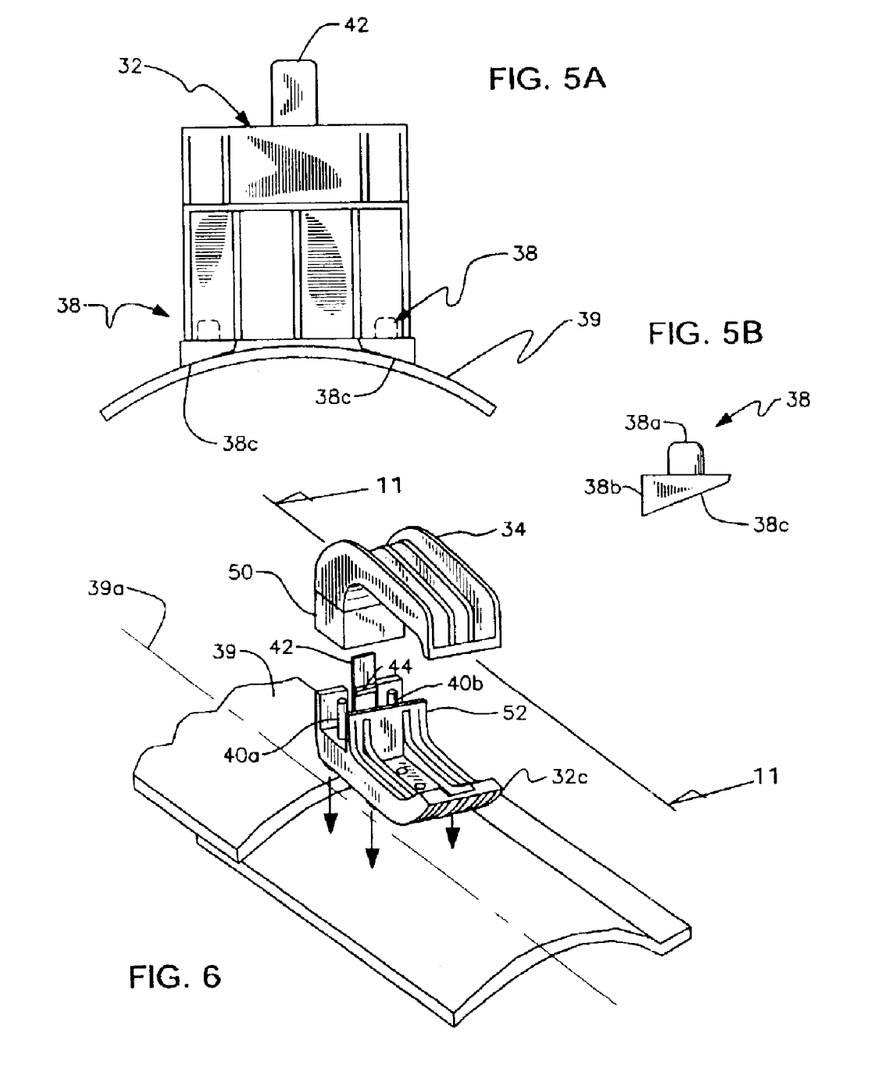
FIG. 5A is a front elevational view of the novel clamp base when installed on a barrel tile.
FIG. 5B is a side elevational view of one of the novel foot members used in barrel tile applications.
FIG. 6 is an exploded perspective view depicting the base and the top of the novel alligator clamp in spaced apart relation to one another and in spaced apart relation to a barrel tile.

A plurality of foot members, collectively denoted 38 in FIGS. 5A and 5B, for use in barrel tile applications but not needed in applications where the roof covering is flat, are adapted to releasably engage preselected open-bottomed chambers. Specifically, as best depicted in FIG. 5B, each foot member 38 has a flexible and resilient elastomeric construction and includes top part 38a that press-fittingly engages a preselected open-bottomed chamber 36c. A bottom part 38b is larger than said top part and cannot enter into an open-bottomed chamber. The bottom surface 38c of each flat bottom part 38b is angled as depicted.

Thus, when arranged as depicted in FIGS. 4 and 5A, said bottom surfaces collectively engage the convex surface of a barrel tile 39. In this particular example, two foot members are positioned on a first side of a longitudinal centerline 39a (FIG. 6) of said barrel tile and two foot members are positioned on a second side of said longitudinal centerline. FIG. 5A is a frontal view of barrel tile 39, depicting how inclined surfaces 38c of said foot members 38 conform to the convex shape of said barrel tile 39.

Returning to FIG. 4, apertures 37a, 37b, and 37c are formed in base wall 36 and inner tubular members 39a, 39b, and 39c respectively depend from said base wall in registration with said apertures. Outer tubular members 39d, 39e, and 39f are concentrically disposed with respect to each inner tubular member. The inner and outer tubular members have the same extent as partition walls 36a, 36b so that the respective free ends of said parts are flush with one another and collectively form a flat bottom for clamp base 32.

As perhaps best depicted in FIGS. 3 and 6, base 32 further includes a pair of upstanding alignment posts 40a, 40b. Said alignment posts are positioned between an upstanding rear wall of clamp base 32 that is collectively formed by laterally spaced apart rigid rear walls 48a, 48b, and slightly flexible and resilient center locking member 42 that is positioned between said rigid rear walls and that has a greater height than either of them.

Figure 7:
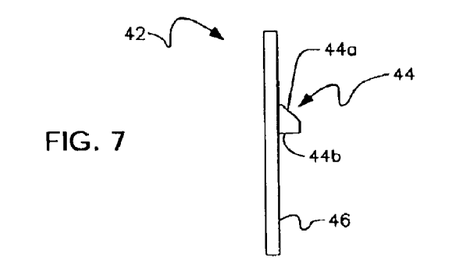
FIG. 7 is a side elevational view of the center wall locking means.

As best depicted in FIG. 7, upstanding center locking wall 42 has engagement member 44 formed integrally therewith. Engagement member 44 includes a downwardly inclined upper surface 44a and a flat lower surface 44b.

Forward surface 46 of locking member 42 is substantially flush with the respective forward surfaces of base clamp rear walls 48a, 48b when center locking wall 42 is in repose (FIGS. 3 and 6).

Clamp top 34, as perhaps best depicted in FIG. 6, includes pedestal 50 that is slideably and snugly received between the aforementioned base clamp rear wall, collectively defined by laterally spaced apart rigid rear walls 48a, 48b and center locking wall 42, and base clamp forward wall 52.

Figure 9:
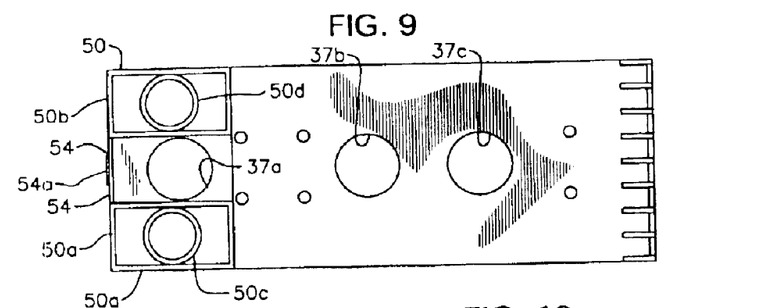
FIG. 9 is a bottom view of the novel clamp top.
Figure 10:
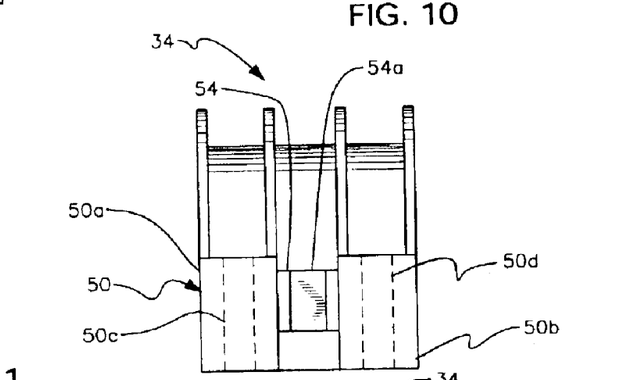
FIG. 10 is a front elevational view of the novel clamp top.

Turning now to FIGS. 9 and 10, it will there be seen that pedestal 50 has a generally bifurcated construction and includes laterally spaced apart pedestal parts 50a, 50b having a pair of tubular members 50c, 50d respectively formed therein. Rear interconnecting wall 54 of pedestal 50 has a slightly inclined protuberance 54a formed centrally thereof.

Figure 8:
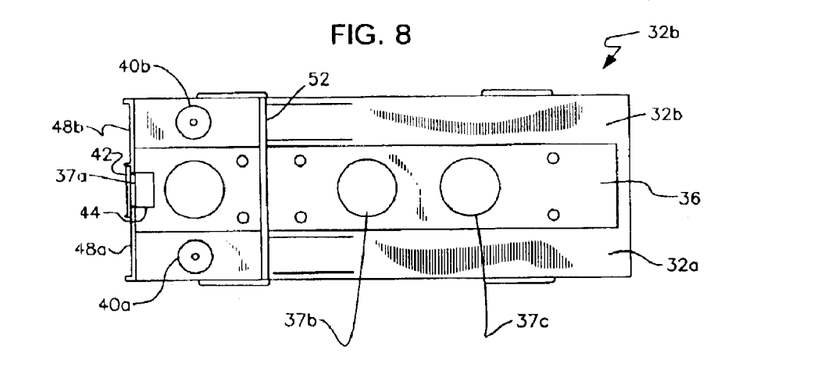
FIG. 8 is a top plan view of the novel clamp base.

To mount top header 12 to a barrel tile 39, top part 38a of each foot 38 is press fit into a preselected chamber 36c and the sloped bottom surface 38c of each foot is placed into overlying relation to a preselected barrel tile. A fastener is then introduced into each aperture 37a, 37b, and 37c and each of said fasteners extends through the lumen of inner tubular members 39a, 39b, 39c and engages the roof supporting the barrel tile, thereby firmly holding clamp base 32 to said barrel tile. Header 12 is then placed atop support surfaces 32a, 32b (FIG. 8) of clamp base 32, forwardly of forward wall 52 and rearwardly of upturned forward end 32c of said clamp base.

Base wall 36 is recessed with respect to support surfaces 32a, 32b so that the unillustrated fasteners that extend through apertures 37a, 37b, and 37c do not interfere with said header.

Pedestal 50 is then inserted between the rear wall collectively defined by rear walls 48a, 48b, and center locking wall 42, and forward wall 52 of clamp base 32. Posts 40a, 40b are therefore slideably received within the respective lumens of tubular members 50c, 50d formed in said pedestal parts 50a, 50b, respectively.

Figure 11:
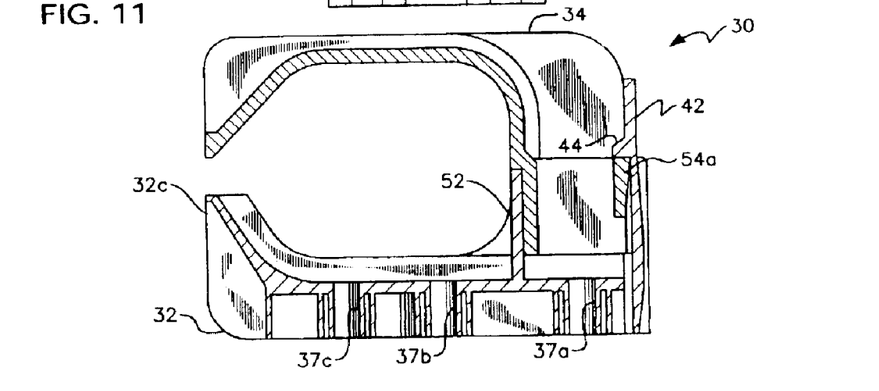
FIG. 11 is a longitudinal sectional view of said novel clamp top.

Inclined protrusion 54a of pedestal interconnecting wall 54 slidingly bears against downwardly inclined surface 44a of engagement means 44, thereby transiently forcing center locking wall 42 to displace slightly rearwardly relative to its position of repose until inclined protrusion 54a clears engagement means 44 and said engagement means snaps back into its position of repose. When said engagement means has resumed its position of repose, flat under surface 44b overlies the top edge of pedestal interconnecting wall 54, thereby locking clamp top 34 to clamp base 32 and sandwiching header 12 therebetween. See FIG. 11.

Clamp top 34 is separable from clamp base 32 if a rearwardly-directed force is imparted to the uppermost free end of center locking wall 42 so that flat under surface 44b of said engagement means is not in overlying relation to said top edge of said pedestal interconnecting wall 54, thereby enabling retraction of pedestal 50 from the space between the rear and forward walls of said clamp base 32.

The downwardly turned free end of clamp top 34 is spaced apart from the upwardly turned end of clamp base 32 when pedestal 50 is fully seated, but said spacing is substantially less than the diameter of header 12 so said header cannot escape therefrom. The spacing between the clamp base and the clamp top allows transverse and longitudinal expansion of the header to take place in the substantial absence of increased stress on the unillustrated fastener members.

In this way, the header of a solar collector is firmly mounted to a barrel tile roof. At least two of the novel clamps 30 are employed for such purpose but more than two may be employed if the length of the header is sufficient to require more than two clamps. Each clamp preferably has four feet 38 that match the contour of a barrel tile so the resulting installation is stable, strong, and aesthetically pleasing.

Essentially the same construction is provided for roofs covered by shingles, tin, or other flat covering, there being no requirement for feet 38 where no convexity is presented. The novel clamps may be positioned at any desired location along the extent of a header and thus at any desired location on the roof.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described,
What is claimed is:

1. A clamp for holding a solar collector header on a roof, comprising:
a clamp base adapted to overlie said roof;
a clamp top adapted to releasably engage said clamp base;
said clamp base and clamp top, when releasably engaged to one another, collectively forming a space between them having a size sufficient to capture and retain without gripping said solar collector header so that said solar collector header may move freely as the collector expands and contracts in response expand and contract responsive to temperature fluctuations;
said clamp base including a base wall;
at least one aperture formed in said base wall;
at least one fastening means adapted to extend through said at least one aperture and engage said roof;
said clamp top including a top part adapted to overlie said header;
said clamp top further including a pedestal disposed at an angle of substantially ninety degrees relative to said top part; and
said clamp base having a bottom part adapted to underlie said header;
whereby at least one fastening means is adapted to extend through said aperture and engage said roof;
whereby said clamp may be positioned at any preselected location along the extent of said header;
whereby said at least one fastening means may be secured in an optimal location on said roof; and
whereby expansion or contraction of said solar collector header does not place additional stress upon said fastening means or said solar collector header because said clamp captures and retains said solar collector header but allows said solar collector header to expand and contract without constriction.

2. The clamp of claim 1, further comprising:
a recess formed in said base wall in the vicinity of said at least one fastening means so that said fastening means does not interfere with said solar collector header positioned between said clamp base and said clamp top.

3. The clamp of claim 1, further comprising:
said clamp base adapted to releasably engage said pedestal;
said clamp base including a pedestal-receiving space defined by an upstanding rear wall and an upstanding forward wall.

4. The clamp of claim 3, further comprising:
said upstanding rear wall being formed in three parts, said three parts including a first rear wall, a second rear wall laterally spaced apart from said first rear wall, and a center locking wall disposed between said first and second rear walls.

5. The clamp of claim 4, further comprising:
said first and second rear walls constructed so that they are rigid and inflexible;
said center locking wall constructed so that it is flexible and resilient and has a position of repose where it is substantially coplanar with said first and second rear walls;
a pedestal-engaging means formed on a forward surface of said center locking wall;
said pedestal-engaging means adapted to releasably engage said pedestal when said pedestal is positioned in said pedestal-receiving space.

6. The clamp of claim 5, further comprising:
said pedestal having a first part and a second part disposed in laterally spaced apart relation to one another;
an interconnecting wall disposed in interconnecting relation to said first part and said second part;
said pedestal-engaging means disposed in overlying relation to a top edge of said interconnecting wall when said pedestal is fully received within said pedestal-receiving space.

7. The clamp of claim 6, further comprising:
said pedestal-engaging means having a downwardly inclined top surface and a flat, substantially horizontal bottom surface;
said flat, substantially horizontal bottom surface overlying said top edge of said interconnecting wall when said pedestal is fully received within said pedestal-receiving space.

8. The clamp of claim 7, further comprising:
a protrusion formed on a rear surface of said interconnecting wall;
said protrusion being flush with a bottom edge of said interconnecting wall and increasing in thickness gradually so that said protrusion protrudes furthest from said rear surface of said interconnecting wall at the top edge of said interconnecting wall;
said protrusion adapted to slidingly engage said downwardly inclined top surface of said pedestal-engaging means and to transiently displace said center locking wall in a rearward direction until said flat, substantially horizontal bottom surface of said pedestal-engaging means clears said top edge of said interconnecting wall.

9. The clamp of claim 8, further comprising:
said center locking wall having a height greater than the height of said first and second rear walls;
said center locking wall being displaceable in a rearward direction to disengage said bottom surface of said pedestal-engaging means from said top edge of said interconnecting wall so that said pedestal and hence said clamp top part may be separated from said clamp bottom part.

10. The clamp of claim 9, further comprising:
a pair of laterally spaced, upstanding alignment posts formed on said clamp base wall between said rearward wall and said forward wall;
a corresponding pair of tubular members, each of which has a post-receiving lumen, formed in said pedestal, there being a first tubular member formed in said first pedestal part and a second tubular member formed in said second pedestal part.

11. The clamp of claim 1, further comprising:
a plurality of longitudinally and transversely disposed partition walls depending from said base wall;
a plurality of chambers formed by said partition walls;
a plurality of foot members adapted to engage said clamp base;
each foot of said plurality of foot members having a top part and a bottom part;
each top part formed of a resilient, elastomeric material;
each top part being secured by a press fit into a preselected chamber of said plurality of chambers;

each bottom part being larger than its associated top part so that each bottom part limits the depth of insertion of each top part into its associated chamber.

12. The clamp of claim 11, further comprising:

each bottom part having an inclined bottom wall to conform to the convex shape of said barrel tile;

each foot of said plurality of foot members adapted to abuttingly engage a barrel tile;

at least one foot of said plurality of foot members positioned on said barrel tile in spaced relation from a longitudinal centerline of said barrel tile on a first side of said longitudinal centerline; and at least one foot of said plurality of foot members positioned on said barrel tile in spaced relation from a longitudinal centerline of said barrel tile on a second side of said longitudinal centerline;

whereby at least two feet of said plurality of foot members abuttingly engage said barrel tile on opposite sides of said longitudinal centerline.

* * * * *